(12) United States Patent
Piech et al.

(10) Patent No.: US 11,464,072 B2
(45) Date of Patent: Oct. 4, 2022

(54) SYNCHRONIZED MESH AUDIO COMMUNICATIONS

(71) Applicant: Carrier Corporation, Palm Beach Gardens, FL (US)

(72) Inventors: Marcin Piech, East Hampton, CT (US); Tadeusz Pawel Witczak, Farmington, CT (US); Lukasz Majchrzak, Sierakow (PL); Dawid Milcarek, Poznan (PL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 16 days.

(21) Appl. No.: 17/096,607

(22) Filed: Nov. 12, 2020

(65) Prior Publication Data

US 2021/0153292 A1    May 20, 2021

Related U.S. Application Data

(60) Provisional application No. 62/935,240, filed on Nov. 14, 2019.

(51) Int. Cl.
| | |
|---|---|
| *H04W 84/18* | (2009.01) |
| *H04L 45/02* | (2022.01) |
| *H04W 40/24* | (2009.01) |
| *H04W 56/00* | (2009.01) |

(52) U.S. Cl.
CPC ............ *H04W 84/18* (2013.01); *H04L 45/02* (2013.01); *H04W 40/24* (2013.01); *H04W 56/001* (2013.01)

(58) Field of Classification Search
None
See application file for complete search history.

(56) References Cited

U.S. PATENT DOCUMENTS

| | | | |
|---|---|---|---|
| 6,288,637 | B1 | 9/2001 | Thomas et al. |
| 7,053,770 | B2 | 5/2006 | Ratiu et al. |
| 8,149,109 | B2 | 4/2012 | Lontka |
| 8,294,566 | B2 | 10/2012 | Morwood et al. |
| 9,264,161 | B2 | 2/2016 | Frison et al. |
| 9,443,405 | B2 | 9/2016 | Kore |
| 9,516,440 | B2 * | 12/2016 | Jarvis .................... H04J 3/0664 |
| 9,743,372 | B2 | 8/2017 | Frison et al. |

(Continued)

FOREIGN PATENT DOCUMENTS

EP        3116264 A2    1/2017

OTHER PUBLICATIONS

European Search Report for Application No. 20207698.0; dated Jun. 16, 2021; 14 Pages.

(Continued)

*Primary Examiner* — Nicholas Sloms
(74) *Attorney, Agent, or Firm* — Cantor Colburn LLP

(57) ABSTRACT

A communications system includes a root node; a plurality of nodes in communication with the root node, the plurality of nodes defining a mesh network; the root node configured to: determine a time delay to each node of the plurality of nodes; transmit audio data to the plurality of nodes, the plurality of nodes configured to produce audio corresponding to the audio data; transmit a delay code to the plurality of nodes, each of the plurality of nodes producing the audio corresponding to the audio data at a time corresponding to the delay code.

12 Claims, 6 Drawing Sheets

(56) References Cited

U.S. PATENT DOCUMENTS

| | | | |
|---|---|---|---|
| 9,875,644 B2 | 1/2018 | Chiarizio et al. | |
| 10,043,378 B2 | 8/2018 | Otis et al. | |
| 10,074,265 B2 | 9/2018 | Moffa | |
| 10,192,411 B2 | 1/2019 | Wedig et al. | |
| 10,985,850 B1* | 4/2021 | Ichapurapu | H04H 20/71 |
| 2003/0046032 A1 | 3/2003 | Puthiyedath | |
| 2008/0145045 A1* | 6/2008 | Chen | G03B 1/00 |
| | | | 396/411 |
| 2009/0231117 A1 | 9/2009 | Cohen | |
| 2010/0238018 A1 | 9/2010 | Kelly | |
| 2011/0222528 A1* | 9/2011 | Chen | G01S 5/18 |
| | | | 370/350 |
| 2014/0219267 A1* | 8/2014 | Eyuboglu | H04W 56/001 |
| | | | 370/350 |
| 2016/0071404 A1* | 3/2016 | Chiarizio | G08B 17/10 |
| | | | 340/577 |
| 2016/0302166 A1* | 10/2016 | Dang | H04L 65/4076 |
| 2016/0381596 A1 | 12/2016 | Hu et al. | |
| 2019/0045475 A1 | 2/2019 | Kasichainula | |
| 2019/0066464 A1 | 2/2019 | Wedig et al. | |
| 2019/0075398 A1* | 3/2019 | Shirai | H04R 27/00 |
| 2019/0104424 A1* | 4/2019 | Hariharan | H04R 3/12 |
| 2020/0228934 A1* | 7/2020 | HomChaudhuri | H04W 4/06 |

OTHER PUBLICATIONS

Yan Zhang et al. "Wireless Mesh Networking", Jan. 1, 2007, Auerbach Publications, XP055187521. Pages 610.

Partial European Search Report for Application No. 20207698.0; dated Mar. 22, 2021; 13 Pages.

* cited by examiner

SYNCHRONIZED MESH AUDIO COMMUNICATIONS

CROSS-REFERENCE TO RELATED APPLICATIONS

This application claims the benefit of Provisional Application No. 62/935,240 filed Nov. 14, 2019, the disclosure of which is incorporated herein by reference in its entirety.

BACKGROUND

The subject matter disclosed herein generally relates to mesh networks and, more particularly, to a mesh network of nodes to provide audio to a space.

Existing building protection systems employ a combination of different sensors, actuators and annunciators communicating over wired connections with building protection control panel, such as fire panel. Within these systems, annunciators used for real-time audio warnings (e.g., broadcasting live messages to occupants) or alternatively for pre-recorded messages and music streaming require multiple pairs of wires (e.g., for power and data transfer) and often do not facilitate sending different messages to different zones within a building. Moreover, both large wired and wireless audio systems suffer long delays between nodes distant from each other, which may result in repeated and overlapping speech playback that is difficult to understand. In fact, the National Fire Alarm and Signaling Code, NFPA 72, mandates synchronized playback of warning signals and messages for Emergency Voice/Alarm Communication Systems (EVACS) within commercial and industrial spaces.

SUMMARY

According to an embodiment, a communications system includes a root node; a plurality of nodes in communication with the root node, the plurality of nodes defining a mesh network; the root node configured to: determine a time delay to each node of the plurality of nodes; transmit audio data to the plurality of nodes, the plurality of nodes configured to produce audio corresponding to the audio data; transmit a delay code to the plurality of nodes, each of the plurality of nodes producing the audio corresponding to the audio data at a time corresponding to the delay code.

In addition to one or more of the features described herein, or as an alternative, further embodiments may include wherein each of the plurality of nodes is associated with a unique node identifier.

In addition to one or more of the features described herein, or as an alternative, further embodiments may include wherein the root node is configured to associate each of the plurality of nodes with a zone identifier.

In addition to one or more of the features described herein, or as an alternative, further embodiments may include wherein determining the time delay to each node of the plurality of nodes comprises the root node sending an initialization message including a timestamp to each of the plurality of nodes and receiving a reply message from each node of the plurality of nodes indicating the time delay.

In addition to one or more of the features described herein, or as an alternative, further embodiments may include wherein the audio data is transmitted to the plurality of nodes in a series of frames.

In addition to one or more of the features described herein, or as an alternative, further embodiments may include wherein each frame includes a frame identifier and a message containing the audio data.

In addition to one or more of the features described herein, or as an alternative, further embodiments may include wherein a node of the plurality of nodes detects a missing frame in response to a sequence of frame identifiers.

In addition to one or more of the features described herein, or as an alternative, further embodiments may include wherein upon the node of the plurality of nodes detecting the missing frame, the node of the plurality of nodes sending a request to the root node to resend the missing frame.

In addition to one or more of the features described herein, or as an alternative, further embodiments may include wherein the root node resends the missing frame at a high priority.

In addition to one or more of the features described herein, or as an alternative, further embodiments may include wherein upon the node of the plurality of nodes detecting the missing frame and a playback time greater than a time for data re-transmission between the root node and the node of the plurality of nodes, the node of the plurality of nodes sending a request to the root node to resend the missing frame.

According to another embodiment, a method for sending messages between a root node and a plurality of nodes in communication with the root node, the plurality of nodes defining a mesh network includes at the root node: determining a time delay to each node of the plurality of nodes; transmitting audio data to the plurality of nodes, the plurality of nodes configured to produce audio corresponding to the audio data; transmitting a delay code to the plurality of nodes, each of the plurality of nodes producing the audio corresponding to the audio data at a time corresponding to the delay code.

In addition to one or more of the features described herein, or as an alternative, further embodiments may include wherein each of the plurality of nodes is associated with a unique node identifier.

In addition to one or more of the features described herein, or as an alternative, further embodiments may include wherein the root node associates each of the plurality of nodes with a zone identifier.

In addition to one or more of the features described herein, or as an alternative, further embodiments may include wherein determining the time delay to each node of the plurality of nodes comprises the root node sending an initialization message including a timestamp to each of the plurality of nodes and receiving a reply message from each node of the plurality of nodes indicating the time delay.

In addition to one or more of the features described herein, or as an alternative, further embodiments may include wherein the audio data is transmitted to the plurality of nodes in a series of frames.

In addition to one or more of the features described herein, or as an alternative, further embodiments may include wherein each frame includes a frame identifier and a message containing the audio data.

In addition to one or more of the features described herein, or as an alternative, further embodiments may include a node of the plurality of nodes receiving the series of frames; wherein the node of the plurality of nodes detects a missing frame in response to a sequence of frame identifiers.

In addition to one or more of the features described herein, or as an alternative, further embodiments may include wherein upon the node of the plurality of nodes detecting the missing frame, the node of the plurality of nodes sending a request to the root node to resend the missing frame.

In addition to one or more of the features described herein, or as an alternative, further embodiments may include wherein upon the node of the plurality of nodes detecting the missing frame, the node of the plurality of nodes sends a request to the root node to resend the missing frame.

In addition to one or more of the features described herein, or as an alternative, further embodiments may include wherein the node of the plurality of nodes sends the request to the root node to resend the missing frame when a playback time is greater than a time for data re-transmission between the root node and the node of the plurality of nodes.

According to another embodiment, a root node of a communications system includes a processor; a memory; a communications module configured to establish communications with a plurality of nodes defining a mesh network; the root node configured to: determine a time delay to each node of the plurality of nodes; transmit audio data to the plurality of nodes, the plurality of nodes configured to produce audio corresponding to the audio data; transmit a delay code to the plurality of nodes, each of the plurality of nodes producing the audio corresponding to the audio data at a time corresponding to the delay code.

Technical effects of embodiments of the present disclosure include the ability to synchronize audio generated at nodes of a mesh network.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
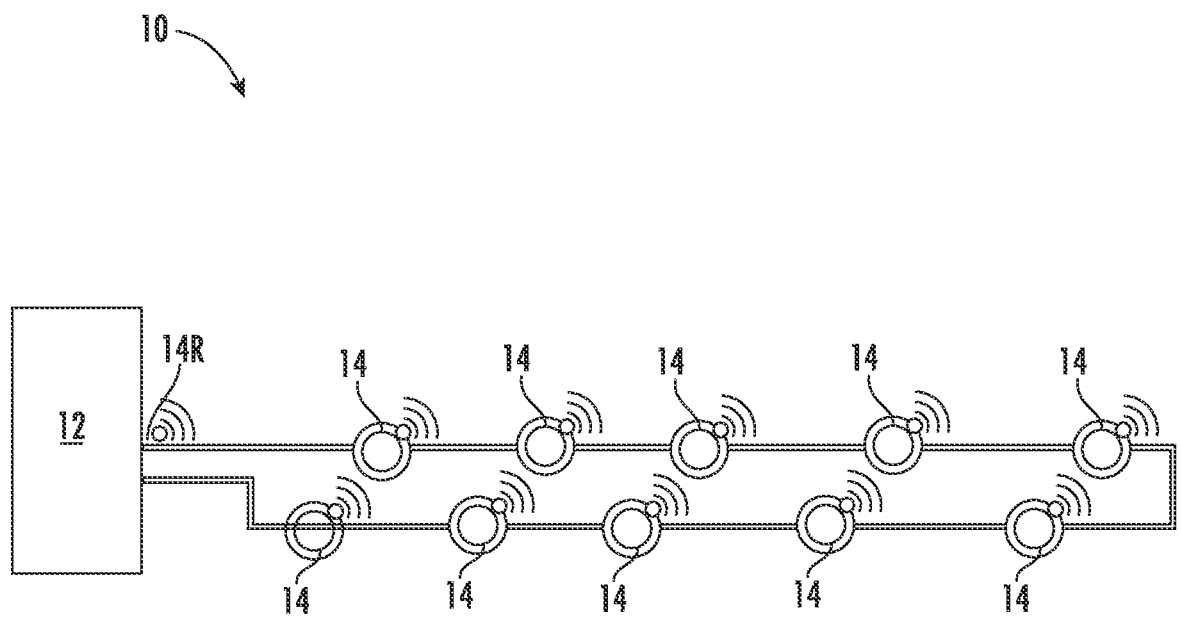
FIG. 1 depicts a communications system in an example embodiment.

FIG. 1 depicts a communications system 10 in an example embodiment. The communications system 10 includes a control panel 12 which may be a control panel for an alarm system associated with a space, for example, a building. A plurality of nodes 14 are in wireless communication with the control panel 12 and with nearby nodes 14. The nodes 14 define a mesh network using a communications protocol, such as Wi-Fi, Bluetooth, BLE, ZigBee, Z-Wave, etc. Each node 14 may be powered by power lines connected to the panel or by power lines connected to an independent power source. The nodes 14 may be powered by other sources, such as a battery installed at each node 14. The battery at each node 14 may be rechargeable. The panel 12 also includes a node, which may serve as a root node 14R of the mesh network. Although not shown, other devices such as detection devices (for example smoke, carbon monoxide, and other hazardous condition detectors, motion detectors, etc.), alert stations (such as call points, pull stations, etc.) may also be connected to the panel and the nodes 14.

Figure 2:
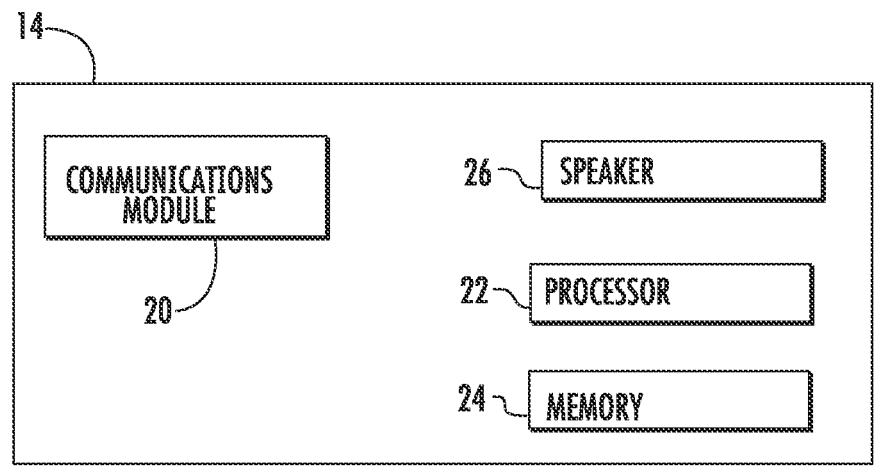
FIG. 2 depicts a node in an example embodiment.

FIG. 2 depicts a node 14 in an example embodiment. Each node 14 may be constructed in a similar manner. A communications module 20 provides for communications between the nodes 14 using a wireless communications protocol, such as Wi-Fi, Bluetooth, BLE, ZigBee, Z-Wave, etc. A processor 22 controls operation of the node 14. The processor 22 may be, but is not limited to, a single-processor or multi-processor system of any of a wide array of possible architectures, including application specific integrated circuits (ASIC), microcontroller unit (MCU), central processing unit (CPU), digital signal processor (DSP), field programmable gate array (FPGA) or graphics processing unit (GPU) hardware arranged homogenously or heterogeneously. A memory 24 provides for storage of instructions and data. The memory 24 may be but is not limited to a random access memory (RAM), read only memory (ROM), or other electronic, optical, magnetic or any other computer readable medium. The memory may store executable instructions, that when executed by the processor 22, cause the processor 22 to perform operations described herein. Otherwise, the memory may be integrated into the processor system, whereby processor 22 and memory 24 become a single integrated circuit. A speaker 26 provides audio output, i.e. sound, from the node 14.

In operation, referring to FIGS. 1 and 2, the panel 12 serves as a root node 14R and sends audio data to the nodes 14 arranged in the mesh network in order to provide the audio (produced as sound) to various locations in a space. Each node 14, including the root node 14R at the panel 12, is assigned a unique node identifier, and the nodes 14 can communicate with any other node 14 in the mesh network using the node identifier.

Figure 3:
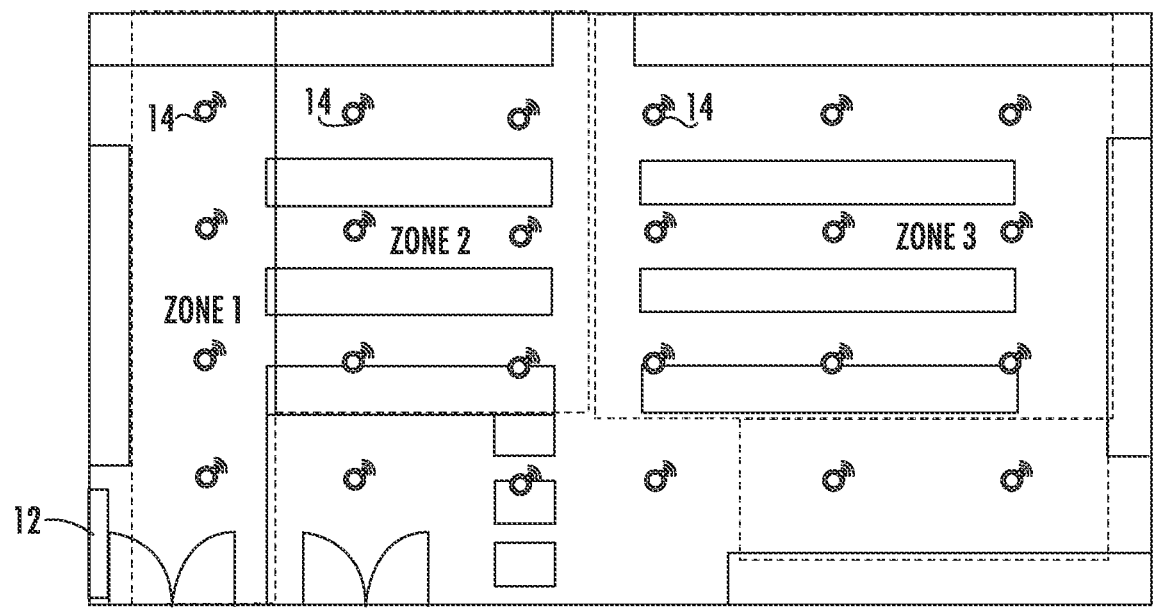
FIG. 3 depicts nodes arranged in zones in an example embodiment.

FIG. 3 depicts nodes 14 arranged in zones in an example embodiment. Nodes 14 can be assigned to zones by associating the node identifier with a zone identifier. The root node 14R may manage the association of the node identifiers associated with each zone identifier, such that the proper nodes 14 are addressed when audio data is provided to specific zone. In other embodiments the association of the node identifiers with each zone identifier may be managed by the panel 12 or by a device communicatively connected to root node 14R through panel 12, and the associations communicated through the root node 14R.

Figure 4:
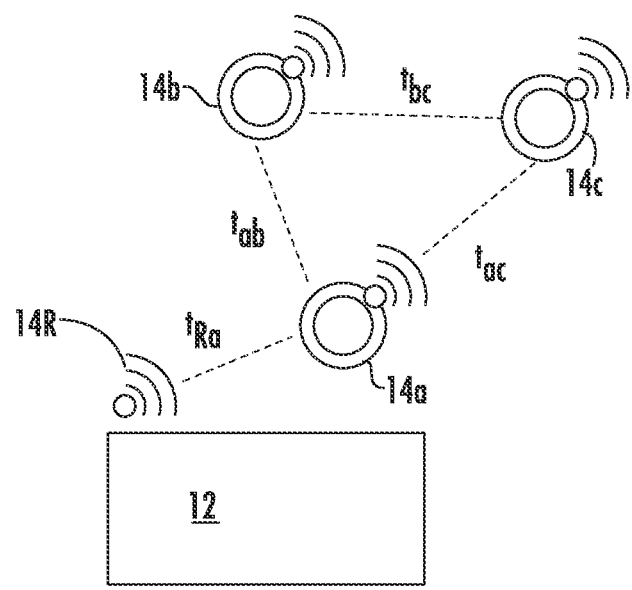
FIG. 4 depicts time delays between nodes in an example embodiment.

FIG. 4 depicts time delays between nodes 14 in an example embodiment. The time delay between nodes is the time needed for a signal to travel between nodes. As shown in FIG. 4, the time delay between a root node 14R at panel 12 and node 14a is $t_{Ra}$. The time delay between node 14a and node 14b is $t_{ab}$. The time delay between node 14a and node 14c is $t_{ac}$. The time delay between node 14b and node 14c is $t_{bc}$.

Figure 5:
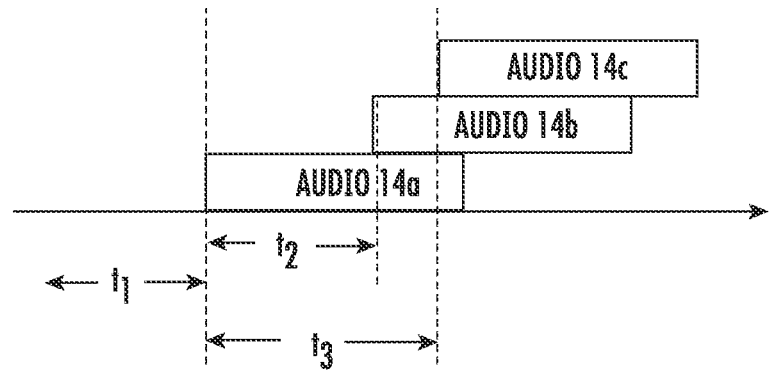
FIG. 5 depicts audio generated at nodes without synchronization in an example embodiment.

FIG. 5 depicts audio generated at nodes 14a, 14b and 14c without synchronization in an example embodiment. The root node 14R at panel 12 sends an audio signal to node 14a, which then forward the audio signal to nodes 14b and 14c. As shown in FIG. 5, the signal from the root node 14R at panel 12 arrives at node 14a after time delay t1. Without synchronization, node 14a will produce audio upon receipt of the audio signal. Node 14b receives the audio signal from node 14a after time delay t2, and produces audio upon receipt of the audio signal. Node 14c receives the audio signal from node 14a after time delay t3, and produces audio upon receipt of the audio signal. Without synchronization, nodes 14a, 14b and 14c generate audio at offset times, which will result in the audio being difficult to understand by persons in the vicinity of nodes 14a, 14b and 14c.

Figure 6:
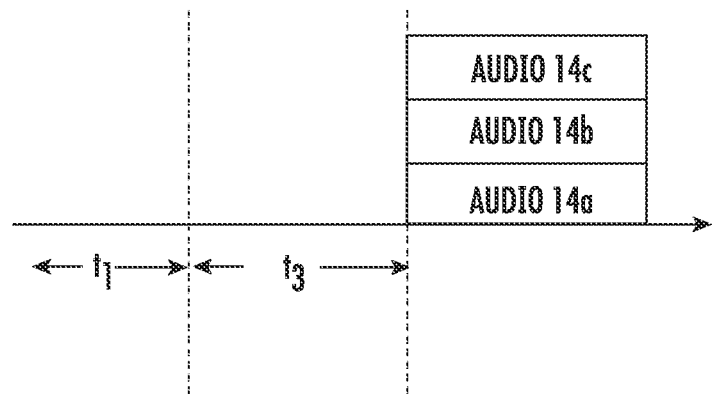
FIG. 6 depicts audio generated at nodes with synchronization in an example embodiment.

FIG. 6 depicts audio generated at nodes 14a, 14b and 14c when synchronization is employed in an example embodiment as described further below with relation to FIG. 7.

Figure 7:
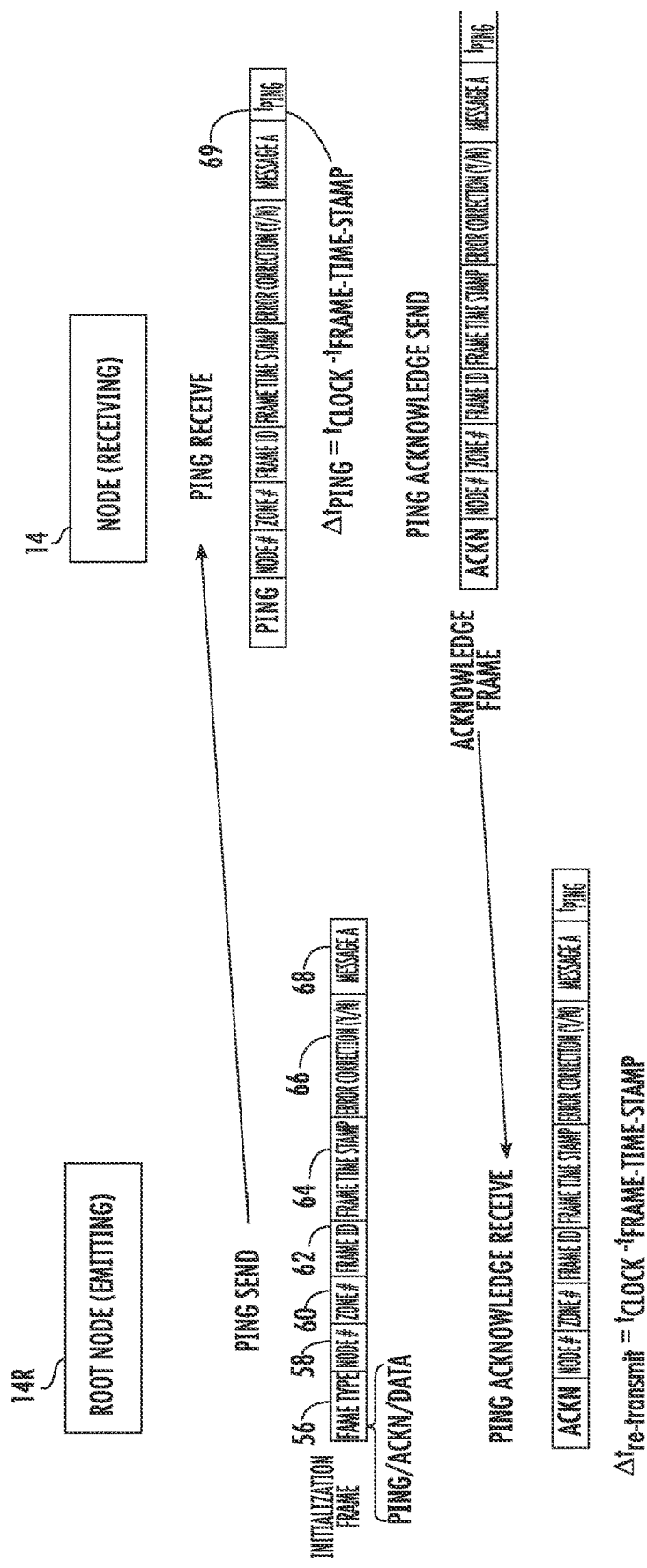
FIG. 7 depicts initialization of the mesh network in example embodiment.

FIG. 7 depicts an initialization and synchronization of the nodes 14 in the mesh network performed prior to normal operation of the communications system. The root node 14R at panel 12 sends an initialization message (e.g., a ping) to each node 14 using a node identifier 58 associated with each node 14. Each frame includes frame type identifier 56 specifying if the message is used for initialization (e.g. PING and ACKN) or for data transmission (e.g. DATA), a zone identifier 60 which is used if the nodes are arranged in zones, such as shown in FIG. 3, and a frame identifier 62 which uniquely identifies the frame and may be used by the receiving node 14 to determine if a message is received in a proper sequence or if it is lost. An error correction field 66 indicates whether error correction is enabled or not. The message field 68, contains exemplary data such as audio clip. A frame time stamp 64 indicates when the initialization message originated. It is denoted by $t_{frame-time-stamp}$ and may be used at the receiving node 14 to determine transmission time 69, $\Delta t_{PING}$ by comparison with the current time denoted by $t_{clock}$. The transmission time 69 indicates how long it took for the initialization message to reach the respective node 14. Each node 14 reads and decodes the data message and then replies to the root node 14R with an acknowledgment message including the transmission time for that node 14. The root node 14R receives re-transmitted message from the node 14 with its node identifier, unique original time stamp, $t_{frame-time-stamp}$ and the transmission time. The root node 14R may also determine re-transmission time, $\Delta t_{re-transmit}$ which combines the time it takes to transmit the message to the node 14, process it at the node 14 and receive acknowledgment from the node 14. The acknowledgment message may contain null or empty data field for faster transmission through the network. The root node 14R stores both the transmission and node identifier for each node 14 in the mesh network and may also store re-transmission times.

To synchronize audio generated at each node, the root node 14R determines which nodes 14 are to receive the audio signal by, for example, determining which nodes 14 are in a specific zone to which audio data is directed from panel 12. The root node 14R then determines which node, of the nodes to produce audio, has the largest transmission time. In the example of FIGS. 4 and 6, node 14c has the largest delay time of t3. When the root node 14R sends the audio signal to nodes 14a, 14b and 14c, the root node 14R also sends a delay code instructing each node 14 to pause until time t3 to generate the audio. As shown in FIG. 6, this results in nodes 14a and 14b delaying generation of the audio until time t3. In this manner, the audio produced at nodes 14a, 14b and 14c is synchronized.

The synchronization of audio produced at nodes 14a, 14b and 14c of FIGS. 4 and 6 is just one example. A similar process can be performed regardless of the number of nodes producing audio in the mesh network and/or whether the nodes are arranged in zones.

Figure 8:
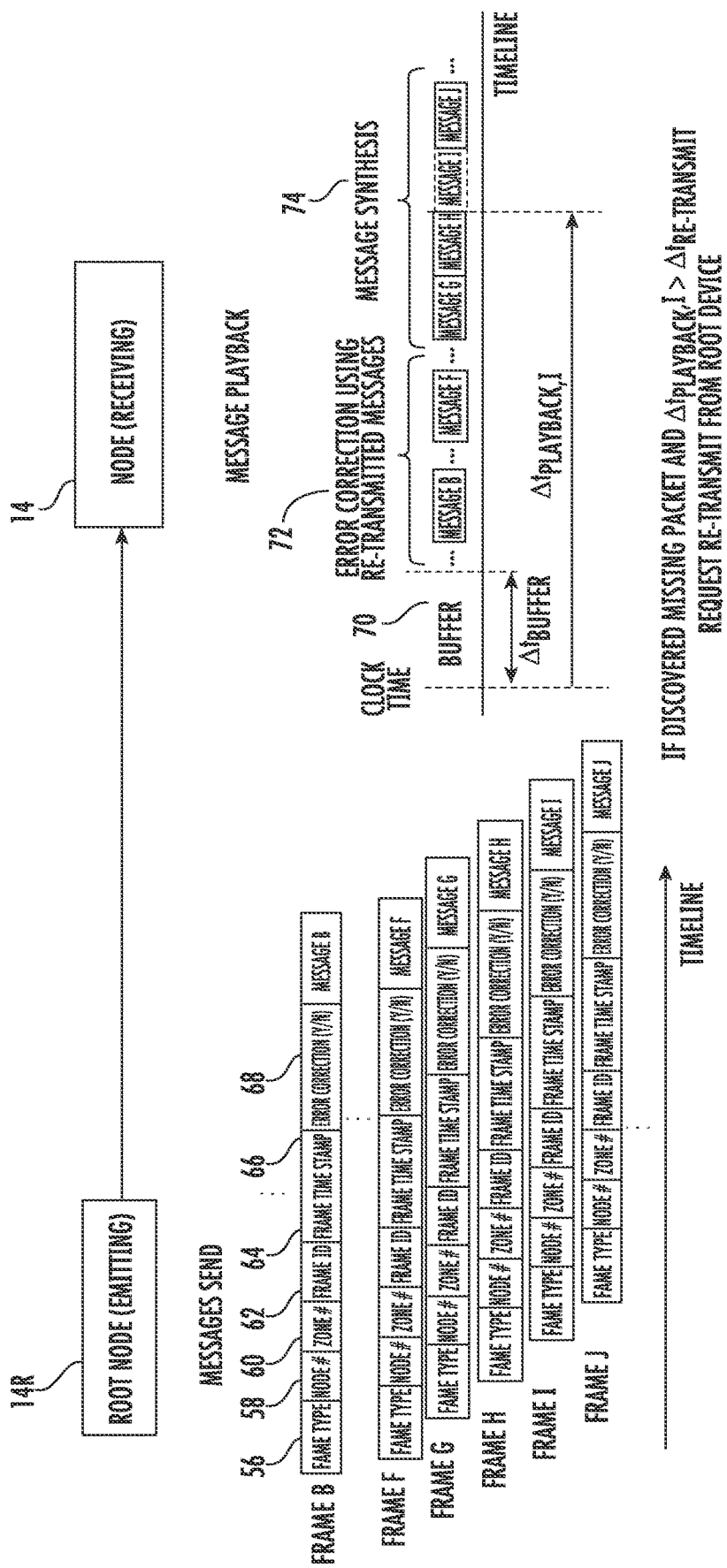
FIG. 8 depicts transmission of messages from a root node to a node in an example embodiment.

FIG. 8 depicts messages sent from a root node 14R to a node 14 in an example embodiment. The root node 14R sends audio packets to the nodes in a series of frames. Each frame is constructed in a manner similar to the initialization frames discussed above in reference to FIG. 7. A frame time stamp 64 indicating the time of transmission of the frame may be used at the receiving node 14 to reconstruct messages in the correct order. If error correction is enabled, duplicate messages may be included in the frame. A message 68 including data being transmitted from the root node 14R to the node 14 may also be referred to as a packet. In the embodiments of FIGS. 1-3, the message 68 includes audio data that is processed at one or more nodes 14 to produce audio at each node 14.

FIG. 8 also depicts playback of the messages at a node 14, and detection of missing messages. A buffer period 70 ($\Delta t_{buffer}$) is used to buffer playback of the messages at the node 14. If error correction is enabled, then an error correction period 72 is used to process duplicate data to detect and correct errors, if present. During a message synthesis period 74, messages from the frames, including the audio data, are decoded and arranged to produce the audio at the node 14.

Figure 9:
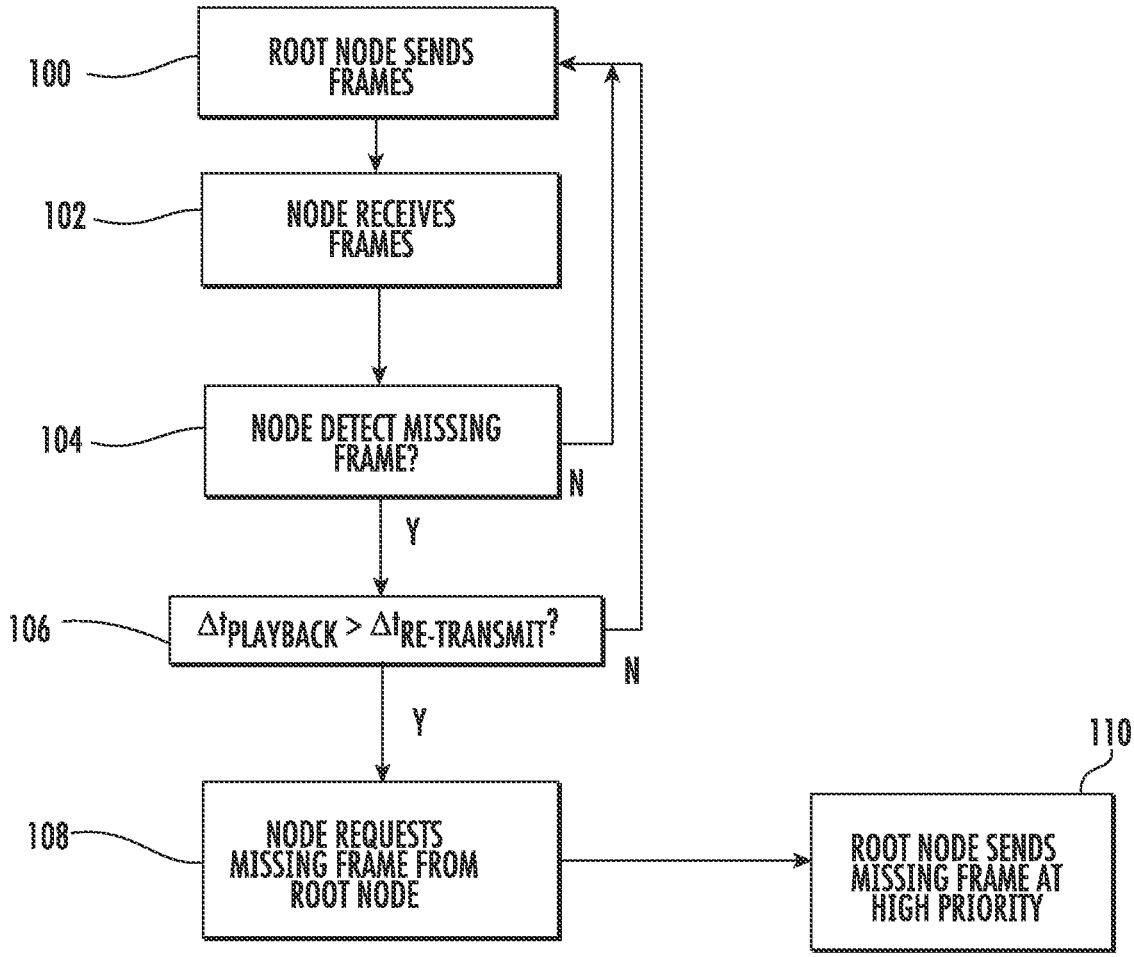
FIG. 9 depicts a process for detecting missing messages in an example embodiment.

Continuing with reference to FIGS. 8 and 9, the node 14 is configured to detect missing messages and request a new frame from the root node 14R. FIG. 9 depicts a process for lost message detection and replacement in an example embodiment addressing playback and re-transmission times depicted in FIG. 8 as $\Delta t_{playback}$ and $\Delta t_{re-transmit}$. The process is described with respect to a root node 14R and one node 14, but applies to all nodes 14 in the mesh network. At 100, the root node 14R sends frames to the node 14. The frames are configured as shown in FIG. 8, for example, frames B-J. At 102, the node 14 begins receiving frames. The frames may be buffered during the buffer period 70. At 104, the node 14 determines if a frame is missing. The node 14 may determine that a frame is missing by comparing the sequence of frame identifiers 62. If no frames are missing, process flow returns to 100 and node 14 continues receiving frames.

If at 104, the node 14 determines that a frame is missing, flow proceeds to 106 where the node determines if a playback time, $\Delta_{playback}$, is greater than the re-transmission time, $\Delta t_{re-transmit}$, between the root node 14R and the node 14. The playback time corresponds to the time available until the given message needs to be played in the correct sequence. The playback time is measured from reception of the first frame and is calculated using the buffer time and length of the played-back messages. If at 106 the playback time is not greater than the re-transmission time between the root node 14R and the node 14, flow returns to 100. In this case, the missing message is not received at the node and playback is not corrected.

If at 106 the playback time is greater than the re-transmission time between the root node 14R and the node 14, flow proceeds to 108 where the node 14 sends a request to the root node 14R to resend the missing frame. The resent frame may be sent at a higher priority than standard transmissions between the root node 14R and the node(s) 14, such that the frame to be re-sent is sent by node 14R earlier than other frames which are being sent in the correct order. In this case, the missing message is received at the node and the playback is appropriately corrected.

Advantageously, embodiments of the present disclosure provide the ability to generate audio at a plurality of nodes of a mesh network in a synchronized manner. This is particularly helpful during live public announcements.

As described above, embodiments can be in the form of processor-implemented processes and devices for practicing those processes, such as a processor in a root node 14R and/or anode 14. Embodiments can also be in the form of computer program code containing instructions embodied in tangible media, such as network cloud storage, SD cards, flash drives and hard drives, or any other computer-readable storage medium. Embodiments can also be in the form of computer program code transmitted over some transmission medium, such as over electrical wiring or cabling, through fiber optics, or via electromagnetic radiation. When implemented on a general-purpose microprocessor or microcontroller, the computer program code configures the microprocessor or microcontroller to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations. Further, one of ordinary skill in the art will appreciate that the steps described in conjunction with the illustrative figures may be performed in other than the recited order, and that one or more steps illustrated may be optional.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A communications system comprising:
a root node;
a plurality of nodes in communication with the root node, the plurality of nodes defining a mesh network;
the root node configured to:
transmit audio data to the plurality of nodes, the plurality of nodes configured to produce audio corresponding to the audio data;
wherein the audio data is transmitted to the plurality of nodes in a series of frames, wherein each frame includes a frame identifier and a message containing the audio data;
the root node is further configured to determine a time delay to each node of the plurality of nodes; and
transmit a delay code to the plurality of nodes, each of the plurality of nodes producing the audio corresponding to the audio data at a time corresponding to the delay code;
a node of the plurality of nodes is configured to:
detect a missing frame in response to a sequence of frame identifiers; and
upon the node of the plurality of nodes detecting the missing frame and determining that a playback time is greater than a time for data re-transmission between the root node and the node of the plurality of nodes, the node of the plurality of nodes sending a request to the root node to resend the missing frame.

2. The communications system of claim 1 wherein:
each of the plurality of nodes is associated with a unique node identifier.

3. The communications system of claim 2 wherein:
the root node is configured to associate each of the plurality of nodes with a zone identifier.

4. The communications system of claim 1 wherein:
determining the time delay to each node of the plurality of nodes comprises the root node sending an initialization message including a timestamp to each of the plurality of nodes and receiving a reply message from each node of the plurality of nodes indicating the time delay.

5. The communications system of claim 1 wherein: the node of the plurality of nodes detects a missing frame in response to a sequence of frame identifiers.

6. The communications system of claim 5 wherein: the root node resends the missing frame ahead of frames being sent in a sequential order.

7. A method for sending messages between a root node and a plurality of nodes in communication with the root node, the plurality of nodes defining a mesh network, the method comprising:
at the root node:
transmitting audio data to the plurality of nodes, the plurality of nodes configured to produce audio corresponding to the audio data;
the root node determining a time delay to each node of the plurality of nodes;
the root node transmitting a delay code to the plurality of nodes, each of the plurality of nodes producing the audio corresponding to the audio data at a time corresponding to the delay code;
the audio data being transmitted to the plurality of nodes in a series of frames wherein each frame includes a frame identifier and a message containing the audio data;
a node of the plurality of nodes receiving the series of frames, and the node of the urality of nodes a missing frame in response to a sequence of frame identifiers;
upon the node of the plurality of nodes detecting the missing frame, the node of the plurality of nodes sending a request to the root node to resend the missing frame when the node of the plurality of nodes determines a playback time is greater than a time for data retransmission between the root node and the node of the plurality of nodes.

8. The method of claim 7 wherein:
each of the plurality of nodes is associated with a unique node identifier.

9. The method of claim 8 wherein:
the root node associates each of the plurality of nodes with a zone identifier.

10. The method of claim 7 wherein:
determining the time delay to each node of the plurality of nodes comprises the root node sending an initialization message including a timestamp to each of the plurality of nodes and receiving a reply message from each node of the plurality of nodes indicating the time delay.

11. The method of claim 1 further wherein the node of the plurality of nodes detects a missing frame in response to a sequence of frame identifiers.

12. The communications system of claim 1 wherein:
the playback time corresponds to the time available until the audio data needs to be played in a correct sequence, the playback time is measured from reception of a first frame at the node of the plurality of nodes and is calculated using a buffer time and a length of the audio data in the message.

* * * * *